United States Patent Office 2,708,189
Patented May 10, 1955

2,708,189

DI-ALKENYL IMIDO CARBONATES AND POLYMERIC MATERIALS DERIVED THEREFROM

Robert G. Nelb, Naugatuck, and Charles H. Alexander, Bethany, Conn., assignors to United States Rubber Company, New York, N. Y., a corporation of New Jersey No Drawing. Application November 30, 1951, Serial No. 259,282

7 Claims. (Cl. 260—45.4)

This invention relates to improvements in chemicals. The present novel chemicals subscribe to the formula

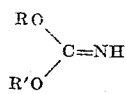

where R and R' represent an allyl or methallyl radical.

Although the new chemicals have carbon-to-carbon unsaturation, they do not homopolymerize but have utility in being able to copolymerize to form resinous bodies with other unsaturated polymerizable materials such as diethyl fumarate, maleic anhydride, and unsaturated alkyd resins, to form insoluble and infusible polymerizates. Such thermoset copolymers have utility as materials for the preparation of hard, heat-stable castings; for the preparation of laminates by impregnating paper, cloth, glass fabric, glass mat, asbestos and similar materials; and for other uses familiar to those skilled in the art.

The following examples, in which parts are by weight, are given to illustrate the invention:

*Example 1.—Preparation of diallyl imido carbonate*

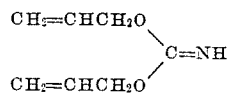

To a stirred solution of cyanogen bromide (43 g., 0.41 m.) in allyl alcohol (50 ml.) and anhydrous benzene (200 ml.) was added a solution of sodium allylate keeping the temperature —10 to 0° C. The sodium allylate was prepared by adding anhydrous allyl alcohol (100 ml.) to a suspension of metallic sodium sand (9.2 g., 0.4 m.) in anhydrous benzene (200 ml.).

At the completion of the reaction with cyanogen bromide (about three hours), the precipitated sodium bromide was filtered off, and the clear filtrate was concentrated under a vacuum of about 145 mm. of mercury. The oily residue was then distilled at a pressure of 15 mm. and there were obtained 32 g. (56% yield) of diallyl imido carbonate, B. P. 90–105° C. An analytical sample was obtained on redistillation of the above material, B. P. 103–105° C./15 mm., $N_D^{20}$ 1.4575.

Analysis:
  Calcd. for $C_7H_{11}O_2N$: C, 59.53; H, 7.86; N, 9.93.
  Found: C, 60.09, 60.16; H, 8.35, 8.18; N, 9.60, 9.72.

*Example 2.—Preparation of dimethallyl imido carbonate*

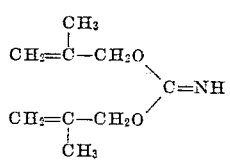

This compound was prepared in 50% yield by substituting methallyl alcohol for the allyl alcohol described in Example 1. The product had a boiling point of 115–118° C./13 mm., $N_D^{20}$ 1.4593.

Analysis:
  Calcd. for $C_9H_{15}O_2N$: N, 8.28.
  Found: N, 8.19, 8.32.

The following examples illustrate the lack of homopolymerizability of the dialkenyl imido carbonates, and the copolymerizability with other polymerizable materials.

Example 3

Samples of diallyl imido carbonate and dimethallyl imido carbonate catalyzed with 2% of benzoyl peroxide did not polymerize during a period of forty-eight hours at 100° C. No polymerization was observed when the compounds were heated under similar conditions with Friedel-Crafts-type catalysts, such as boron trifluoride.

Example 4

| | | |
|---|---|---|
| Diallyl imido carbonate | parts | 7.0 |
| Maleic anhydride | do | 4.9 |
| Benzoyl peroxide | do | 0.12 |
| Benzene | ml | 25 | were heated at 70–80° C. for three hours. A white polymeric material formed and was filtered off. The product was insoluble in acetone and other common organic solvents and was infusible.

Example 5

| | | |
|---|---|---|
| Dimethallyl imido carbonate | parts | 4.2 |
| Maleic anhydride | do | 2.4 |
| Benzoyl peroxide | do | 0.07 |
| Benzene | ml | 12.5 | were heated at 70–80° C. for two hours. The white solid formed was filtered off. It was insoluble in acetone and infusible.

Example 6

| | Parts |
|---|---|
| Diallyl imido carbonate | 3.5 |
| Ethyl fumarate | 8.6 |
| Benzoyl peroxide | 0.12 | were heated at 70° C. for three hours. The product was infusible and insoluble in acetone.

Example 7

| | Parts |
|---|---|
| Dimethallyl imido carbonate | 2.1 |
| Ethyl fumarate | 4.3 |
| Benzoyl peroxide | 0.06 | were heated at 70° C. for three hours. The solid polymeric product was infusible and insoluble in acetone.

*Example 8.—Preparation of an unsaturated alkyd*

Following the procedure described by Ellis U. S. Patent No. 2,255,313 (Example 1, page 4, line 57) there was prepared an unsaturated alkyd resin (resin A) from diethylene glycol and maleic anhydride (diethylene glycol-maleate). This resin was a light colored, viscous material and had an acid number of 46.

Example 9

| | Parts |
|---|---|
| Resin A | 70 |
| Diallyl imido carbonate | 30 |
| Benzoyl peroxide | 1.5 | were mixed and cured between glass plates by first gelling the resin mixture at 70° C. for thirty minutes and further curing the casting for ninety minutes at 110° C. The hard, clear casting had the following hardness values:

Rockwell hardness: M-scale, 99; R scale, 113

The casting was infusible and insoluble in acetone.

Example 10

| | Parts |
|---|---|
| Resin A | 80 |
| Dimethallyl imido carbonate | 20 |
| Benzoyl peroxide | 1.5 | were mixed and cured in the manner described in Example 9. The clear casting was semi-flexible and was insoluble and infusible.

Resin A above can be taken as representative of the action of the copolymerizable unsaturated alkyd resins generally disclosed in U. S. Patent 2,255,313.

Having thus described our invention, what we claim and desire to protect by Letters Patent is:

1. A compound of the formula

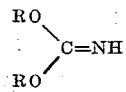

where R represents alkenyl selected from the group consisting of allyl and methallyl.

2. Diallyl imido carbonate.
3. Dimethallyl imido carbonate.
4. A copolymer of a chemical as set forth in claim 1 with a different unsaturated polymerizable material selected from the group consisting of diethyl fumarate, maleic anhydride and polyesters of a glycol and an alpha, beta-unsaturated dicarboxylic acid.
5. A copolymer of a chemical as set forth in claim 1 with a different unsaturated polymerizable material which is a polyester of a glycol and an alpha, beta-unsaturated dicarboxylic acid.
6. A copolymer of diallyl imido carbonate and diethylene glycol-maleate.
7. A copolymer of dimethallyl imido carbonate and diethylene glycol-maleate.

References Cited in the file of this patent

UNITED STATES PATENTS

| | | |
|---|---|---|
| 2,443,741 | Kropa | June 22, 1948 |
| 2,450,682 | Nordlander | Oct 5, 1948 |
| 2,553,564 | Fein et al. | May 22 1951 |
| 2,569,425 | Norria | Sept. 25, 1951 |

OTHER REFERENCES

Nef, Leibig's Annalen der Chemie, 287, 310–325 (1895)

Beilstein, Handbuch der Organischen Chemie (4th ed.), vol. 3, page 37 (1921).